Feb. 16, 1954 M. J. SMITH 2,669,018
KITCHEN OR CAMP IMPLEMENTS
Filed Aug. 22, 1949
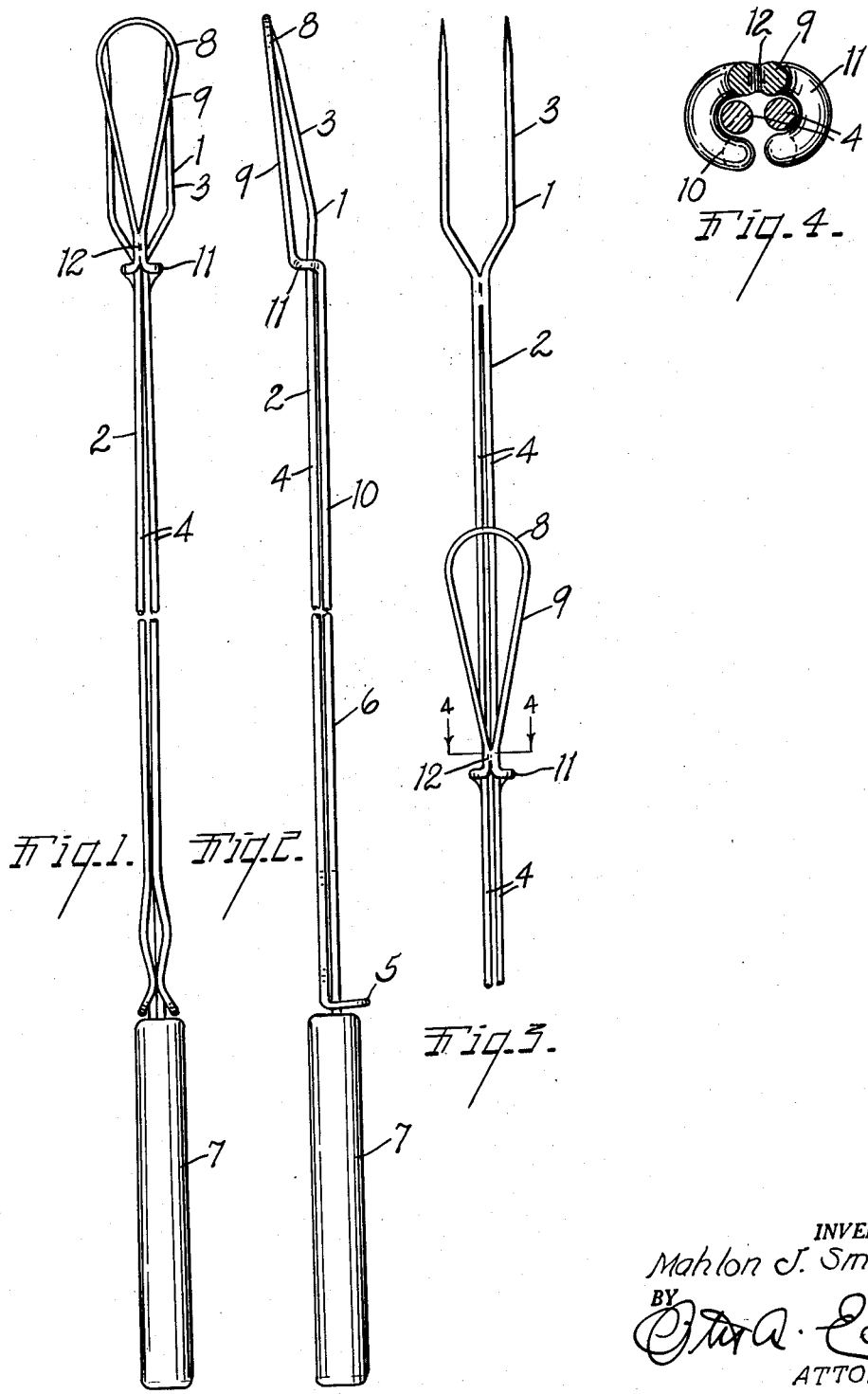
INVENTOR.
Mahlon J. Smith
BY
ATTORNEY.

Patented Feb. 16, 1954

2,669,018

UNITED STATES PATENT OFFICE 2,669,018

KITCHEN OR CAMP IMPLEMENTS

Mahlon J. Smith, Niles, Mich., assignor to Michigan Wire Goods Company, Niles, Mich.

Application August 22, 1949, Serial No. 111,653

5 Claims. (Cl. 30—129)

This invention relates to improvements in kitchen or camp implements.

The main objects of this invention are:

First, to provide a kitchen or camp implement of the fork type provided with a guard for the tines which also serves as a stripper when it is projected to guard position.

Second, to provide an implement of this character which, with the exception of the grip or hand piece, may be formed entirely of wire stock.

Third, to provide a structure having these advantages which is very convenient to manipulate and is strong and durable.

Objects relating to details and economies of the invention will appear from the description to follow. The invention is defined and pointed out in the claims.

A preferred embodiment of the invention is illustrated in the accompanying drawing, in which:

Fig. 1 is a fragmentary plan view of an implement embodying my invention.

Fig. 2 is a fragmentary side elevational view.

Fig. 3 is a fragmentary plan view with the handle partially extended resulting in the retraction of the guard relative to the tines.

Fig. 4 is an enlarged sectional view on a line 4—4 of Fig. 3.

The embodiment of my invention illustrated is designed as a kitchen utensil or implement as well as an implement for use on picnics, camping and the like. The fork 1 is formed integrally with the elongated shank 2 which is formed of wire folded upon itself, the ends of the wire being conformed to provide the tines 3. The reaches 4 of the shank 2 lie in side by side relation terminating in the bight 5 which is angularly disposed to provide an eye receiving the shank 6 of the extension handle.

The extension handle comprises the grip or hand piece 7 and an elongated shank which is formed of a piece of wire folded upon itself with its bight end 8 outwardly and conformed into an elongated loop to constitute a guard 9 for the tines of the fork and also to serve a stripper member for removing objects from the fork. The piece of wire forming the extension handle shank and guard has parallel shank portions 10 connected with the guard portion by the angularly disposed eye 11 which slidably embraces the shank 2 of the fork. The strands of the wire are soldered or welded together at 12 at the base of the guard loop.

The ends of the extension handle strands are inserted in the grip or hand piece. The eye 5 of the shank 2 slidably embraces the extension handle shank 6 and also is extended to provide a finger piece. The shank members 4 are sprung outwardly intermediate their ends to provide frictional engagement with the eye 11 for frictionally holding the parts in their adjusted positions. When the handle is fully collapsed, the guard is in operative position in relation to the tines to guard the same. As it is moved to that position any object impaled by the tines is stripped therefrom. The fork is adapted for use for many purposes—for example, in the roasting of wieners, marshmallows and the like, which can be stripped from the fork without touching with the hands. This is a desirable feature both for sanitary and other reasons.

The structure is very economical to produce. The guard not only prevents accidents but is of advantage in shipping as the prongs do not rupture the shipping carton. I have illustrated and described my invention in a highly practical commercial embodiment thereof. I have not attempted to illustrate other adaptations or modifications contemplated as it is believed that this disclosure will enable those skilled in the art to embody or adapt my invention as may be desired.

Having thus described my invention, what I claim as new and desire to secure by Letters Patent is:

1. The combination of an elongated implement shank member composed of a single piece of wire bent upon itself to provide substantially parallel reaches, the ends of the wire constituting the shank member being extended to provide the tines of a fork, the bight end being conformed to provide an eye disposed at an angle to the reaches, and an elongated handle extension member composed of a single piece of wire bent upon itself to provide substantially parallel reaches, the bight end being conformed to provide an elongated loop-like tine guard and stripper, there being a lateral offset in the handle extension member connecting the outer ends of the said handle extension reaches with the said guard and stripper conformed to provide an eye disposed at an angle to the reaches and slidably embracing the reaches of the implement shank member inwardly of the tines, the said eye of the implement shank member slidably embracing the reaches of the handle extension member and constituting a finger piece, said tines being projectable outwardly beyond the tine guard and stripper into disengaged relation therewith, said offset eye of the handle extension member slidably embracing the reaches of the implement shank member when the tines are projected outwardly beyond the tine guard and stripper and disengaged therefrom.

2. The combination of an elongated implement shank member composed of a single piece of wire bent upon itself to provide substantially parallel reaches, the ends of the wire constituting the shank member being extended to provide the tines of a fork, the bight end being conformed to provide an eye disposed at an angle to the reaches, and an elongated handle extension member composed of a single piece of wire bent upon itself to provide substantially parallel reaches, the bight end being conformed to provide a tine guard, there being a laterally offset eye connecting the said handle extension reaches with the said guard and slidably receiving the reaches of the implement shank member inwardly of the tines, the said eye of the implement shank member slidably receiving the reaches of the handle extension member, said tines being projectable outwardly beyond said tine guard into disengaged relation therewith, said offset eye slidably embracing the reaches of the implement shank member when the tines are disengaged from the tine guard.

3. The combination of an elongated implement shank member comprising parallel reaches provided at their inner end with a laterally offset eye disposed at an angle thereto, the outer ends of the reaches being conformed to provide the tines of a fork, an elongated handle extension member comprising parallel reaches conformed at their outer ends to provide an eye disposed at an angle to the reaches and slidably embracing the parallel reaches of the shank member inwardly of the tines thereof, the eye at the inner end of the shank member slidably embracing the handle extension member, and a tine guard secured to the said eye of said handle extension member and projecting forwardly therefrom to overlie the tines when an object is stripped from the tines, said tines being projectable outwardly beyond said tine guard into disengaged relation therewith, the eye of the extension member slidably embracing the parallel reaches of the shank member when the tines are projected outwardly beyond the tine guard and disengaged therefrom.

4. In combination, an elongated implement shank member comprising parallel reaches terminating in spaced tines at their outer ends, the tines being spaced a greater distance from each other than the parallel reaches inwardly of the tines, and an elongated extension member comprising parallel reaches terminating at their outer ends in a tine guard and a laterally offset eye intermediate the tine guard and parallel reaches thereof, said eye slidably embracing the parallel reaches of the shank member inwardly of the tines thereof the parallel reaches of the shank member being normally slightly spaced from each other between their ends to springably engage the eye of the extension member for releasably holding the shank and extension members in adjusted positions relative to each other.

5. In combination, an elongated implement shank member comprising parallel reaches terminating in spaced tines at their outer ends, the tines being spaced a greater distance from each other than the parallel reaches inwardly of the tines, and an elongated extension member comprising parallel reaches terminating at their outer ends in a tine guard and a laterally offset eye intermediate the tine guard and parallel reaches thereof, said eye slidably embracing the parallel reaches of the shank member inwardly of the tines thereof, said tines being projectable outwardly beyond said tine guard into disengaged relation therewith, the eye of the extension member slidably embracing the parallel reaches of the shank member when the tines are projected outwardly beyond the tine guard and disengaged therefrom.

MAHLON J. SMITH.

References Cited in the file of this patent

UNITED STATES PATENTS

| Number | Name | Date |
|---|---|---|
| 481,691 | Currie et al. | Aug. 30, 1892 |
| 1,242,965 | Muraf | Oct. 16, 1917 |
| 2,124,313 | Riddell | July 19, 1938 |
| 2,187,145 | Brown | Jan. 16, 1940 |